United States Patent
Shin

(10) Patent No.: US 7,735,885 B2
(45) Date of Patent: Jun. 15, 2010

(54) REAR BUMPER ASSEMBLY AND TAIL TRIM COVER FOR VEHICLE

(75) Inventor: Hee Sun Shin, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 12/336,201

(22) Filed: Dec. 16, 2008

(65) Prior Publication Data

US 2009/0236868 A1  Sep. 24, 2009

(30) Foreign Application Priority Data

Mar. 21, 2008  (KR)  ............... 10-2008-0026124

(51) Int. Cl.
B60R 19/00  (2006.01)
(52) U.S. Cl. ...................................... 293/113
(58) Field of Classification Search ............ 293/113; 180/309

See application file for complete search history.

(56) References Cited

U.S. PATENT DOCUMENTS 2,841,232 A * 7/1958 Loeffler ............. 180/89.2
2,979,357 A * 4/1961 Leach et al. ............. 293/113
2008/0036222 A1* 2/2008 Iwamoto et al. ............. 293/113

FOREIGN PATENT DOCUMENTS

JP  2006-316705 A  11/2006

* cited by examiner

Primary Examiner—Joseph D Pape
(74) Attorney, Agent, or Firm—Morgan, Lewis & Bockius LLP

(57) ABSTRACT

A rear bumper assembly and a tail trim cover are disclosed herein. The rear bumper cover comprises a rear bumper cover having an exhaust hole portion, a main tail trim mounted to the exhaust hole portion, and a tail trim cover coupled to the main tail trim. Bent portions defining a gradually decreasing diameter are formed in a joint region between the main tail trim and the tail trim cover.

17 Claims, 3 Drawing Sheets

REAR BUMPER ASSEMBLY AND TAIL TRIM COVER FOR VEHICLE

CROSS-REFERENCE TO RELATED APPLICATION

This application claims priority to Korean Application No. 10-2008-0026124 filed Mar. 21, 2008, the entire contents of which applications is incorporated herein for all purposes by this reference.

BACKGROUND OF THE INVENTION

1. Field of the Invention

The present invention relates to a rear bumper assembly and a tail trim cover for a vehicle through which the tail pipe of a muffler is inserted.

2. Description of Related Art

In a vehicle, a tail trim is mounted to a rear bumper cover such that the tail pipe of a muffler can be installed through the tail trim.

Referring to FIG. 1, a tail trim 10 composed of a main tail trim 16, a tail trim upper cover 12 and a tail trim lower cover 13 is assembled to a rear bumper cover 20 such that the tail trim 10 is matched to the exhaust hole of the rear bumper cover 20.

When the rear bumper cover 20 and the tail trim 10 are assembled together, the tail trim 10 is fastened to the rear bumper cover 20 by way of separate mounting brackets 11, and an insertion part 15 of the tail trim 10, through which the tail pipe of a muffler is inserted, is fastened to the rear bumper cover 20 through a welded mounting bracket 14.

Since the tail trim 10 is fastened to the rear bumper cover 20 by way of the separate mounting brackets 11, the manufacturing and material costs increase, and ease of assembly is degraded due to the addition of a welding process. Also, because welding parts are exposed to the outside, the outer appearance is likely to be deteriorated.

Meanwhile, referring to FIG. 2, the tail trim upper cover 12 and the tail trim lower cover 13 are locked in a surface matching type such that they are fitted around and then welded to the main tail trim 16. At this time, in the joint region A' between the tail trim covers 12 and 13 and the main tail trim 16, a step or a gap (of about 5 mm) that is different from an original design comes at the distal end of the main tail trim 16. In this state, if exhaust gas is discharged through the tail trim 10 via the tail pipe of the muffler, exhaust gas discharge noise or flow-induced noise is generated in the joint region A' due to the presence of the non-continuous portion, i.e., step or the gap, as a result of which vibration noise is generated in the tail trim 10.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a rear bumper assembly and a tail trim cover for a vehicle, which can reduce rear seat noise including the noise generated due to vibration in the joint between a main tail trim and a rear bumper cover and flow-induced noise.

An aspect of the present invention may be directed to a rear bumper assembly of a vehicle, including a rear bumper cover having an exhaust hole portion therein, a main tail trim mounted to the exhaust hole portion, and/or a tail trim cover coupled to the main tail trim, wherein bent portion defining a gradually decreasing diameter toward a longitudinal axis of the main tail trim may be formed in a joint region between the main tail trim and the tail trim cover.

Locking flanges for locking the main tail trim to the rear bumper cover may be formed monolithically with the main tail trim. The tail trim cover may have an upper tail trim cover and a lower tail trim cover which may be coupled with each other. Spot welding portions to be spot-welded with each other may be protrusively formed on sides of the upper tail trim cover and the lower tail trim cover. Guide portion may be formed on the bent portion to cover the joint region between the main tail trim and the tail trim cover.

Another aspect of the present invention is directed to a rear bumper assembly of a vehicle including a rear bumper cover having an exhaust hole portion extending in a forward direction of the vehicle, a main tail trim, a portion of which may be mounted to the exhaust hole portion, and/or a tail trim cover coupled to and enclosing outer circumference of tubular portion of the main tail trim, the tail trim including a bent portion to substantially continuously couple the main tail trim and the tail trim cover therebetween to allow an exhaust gas to flow smoothly therethrough.

A gap filler may be filled between distal end of the tubular portion and the bending portion so as to increase a continuity between the main tail trim and the tail trim cover. The bent portion may define a gradually decreasing diameter toward a longitudinal axis of the main tail trim in a joint region of both the main tail trim and the tail trim cover. A locking flange for locking the main tail trim to the rear bumper cover may be formed monolithically on the main tail trim. The locking flange may include a dent portion protruding from the mail tail trim in a rear direction of the vehicle, and/or a locking hole placed at the dent portion wherein a fastening bolt may be locked therethrough.

The tail trim cover may include an upper tail trim cover and a lower tail trim cover which may be coupled with each other. Spot welding portions to be spot-welded with each other may be protrusively formed on lateral sides of the upper tail trim cover and the lower tail trim cover respectively. The upper tail trim cover and the lower tail trim cover may be made monolithically to form a single body.

A guide portion may be formed on the bent portion to cover inner circumference of an distal end of the tubular portion. The guide portion may be filleted so as to increase continuity between the main tail trim and the tail trim cover. A gap filler may be filled between the distal end of tubular portion and the bending portion so as to increase a continuity between the main tail trim and the tail trim cover.

A passenger vehicle may include any of the above-described the bumper assemblies. The passenger vehicle may further include a guide portion formed on the bent portion to cover inner circumference of a distal end of the tubular portion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
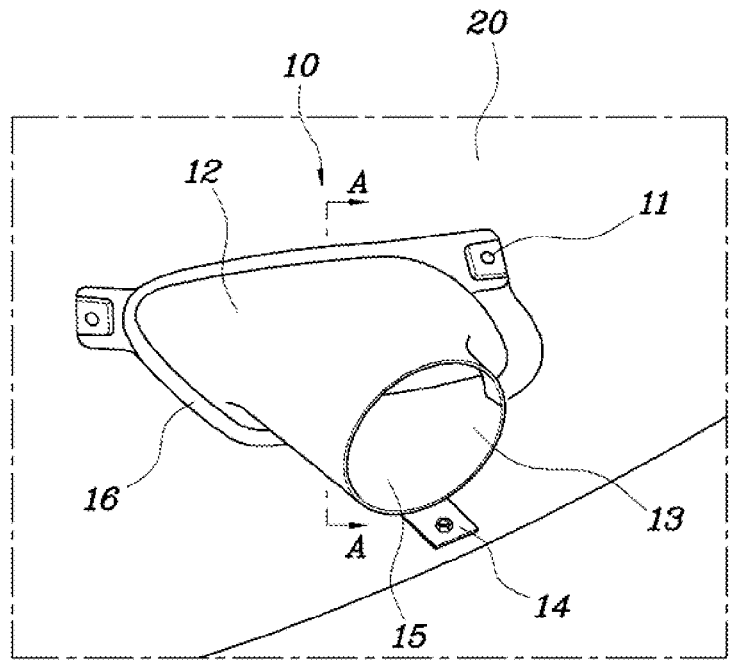
FIG. 1 is a view illustrating a tail trim which is mounted to a rear bumper cover according to the conventional art.
Figure 2:
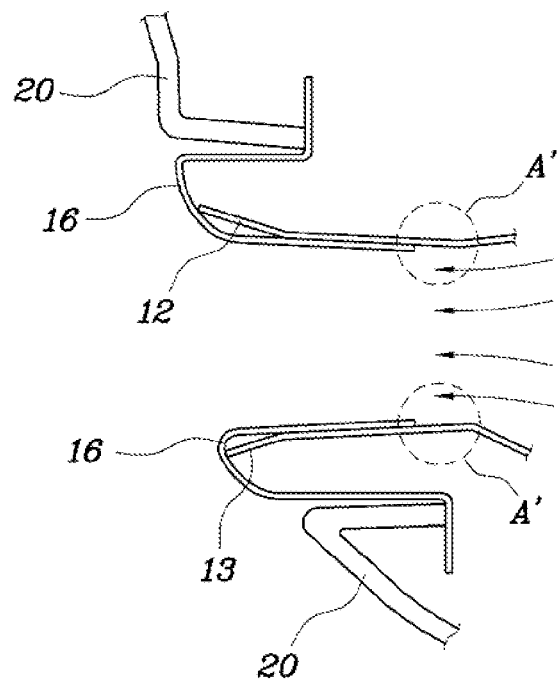
FIG. 2 is a sectional view taken along the line A-A of FIG. 1.
Figure 3:
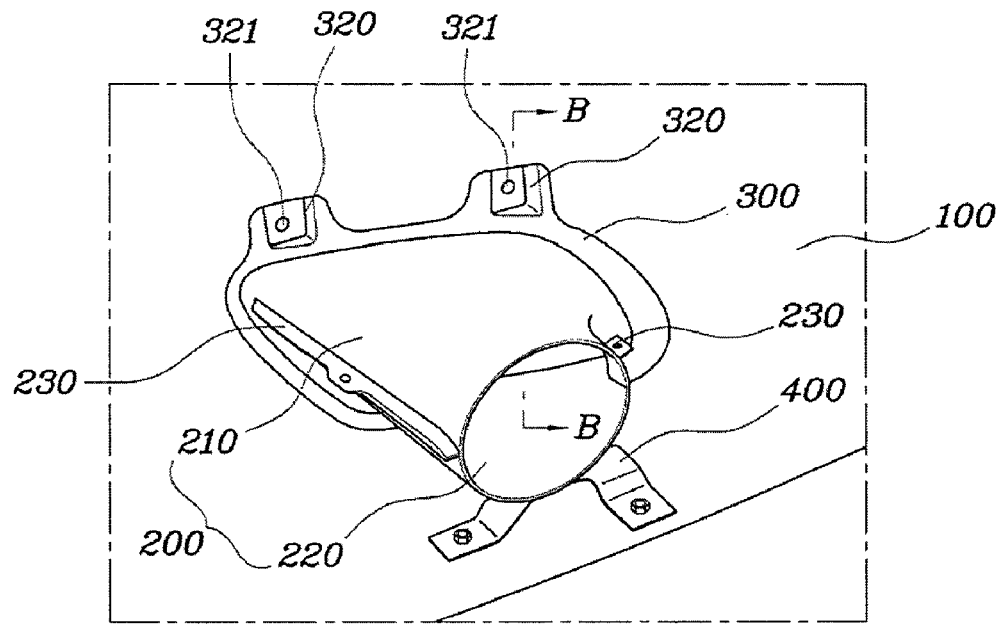
FIG. 3 is a view illustrating an exemplary rear bumper assembly in accordance with the present invention.
Figure 4:
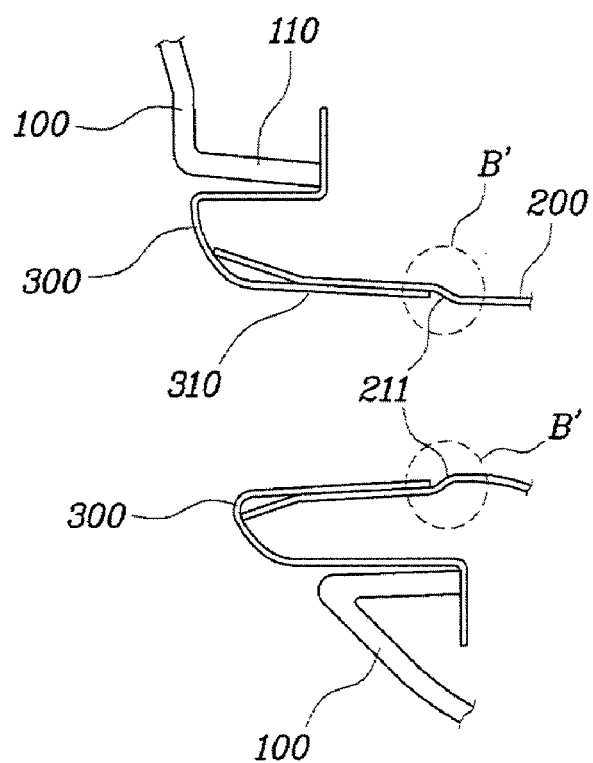
FIG. 4 is a sectional view taken along the line B-B of FIG. 3.
Figure 5:
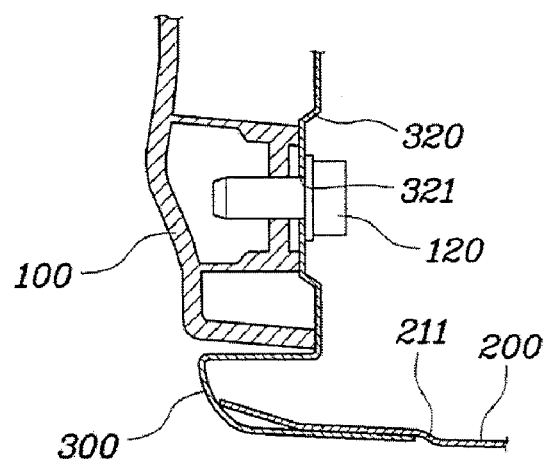
FIG. 5 is a sectional view illustrating the state in which a main tail trim is locked to a rear bumper cover in accordance the present invention.

Referring to FIGS. 3 through 5, in an exemplary embodiment of the present invention, a tail trim cover 200 having bent portions 211 curved toward the longitudinal axis of a tubular portion 310 is assembled around the outer surface of the tubular portion 310 of a main tail trim 300. In this configuration, the tail trim cover 200 and the tubular portion 310 are coupled substantially continuous so that it is possible to prevent noise such as vibration noise and flow-induced noise from occurring in a joint region B' between the tail trim cover 200 and the tubular portion 310.

In various embodiments, a gap filler may be filled between the bent portions 211 and the tubular portion 310 to increase the continuity therebetween.

Furthermore, locking flanges 320 for locking the main tail trim 300 to a rear bumper cover 100 are formed integrally with the main tail trim 300 so that material cost can be decreased and the ease of assembly is improved.

A rear bumper assembly in accordance with various embodiments of the present invention has a structure in which the main tail trim 300 is mounted in an exhaust hole portion 110 of the rear bumper cover 100 and the tail trim cover 200 having the bent portions 211 is fitted around the main tail trim 300.

The main tail trim 300 has the tubular portion 310 which is formed on the center portion of the main tail trim 300 and extends toward the front of a vehicle (the rightward direction in FIG. 4). The tubular portion 310 is connected to and communicates with the tail trim cover 200 so that exhaust gas can be discharged via the tail pipe of a muffler through the tubular portion 310.

The tail trim cover 200 is fitted around the tubular portion 310 in such a way as to surround the outer surface of the tubular portion 310. At this time, when exhaust gas passes through the joint region B' between the tubular portion 310 and the tail trim cover 200, exhaust gas discharge noise or flow-induced noise is likely to be generated. This is because the distal end of the tubular portion 310 projects in the joint region B' so that a step (a gap) is created.

However, in the present invention, the bent portions 211 curved toward the longitudinal axis of a tubular portion 310 are formed in the tail trim cover 200 which is fitted around the outer surface of the tubular portion 310. The bent portions 211 are formed such that the inner diameter of the tail trim cover 200 is decreased in the joint region B'. Accordingly, the exhaust gas guided through the tail pipe of the muffler can smoothly flow from the tail trim cover 200 to the tubular portion 310 through the bent portions 211 which are flush with the distal end of the tubular portion 310. To increase a continuity between the tail trim cover 200 and the tubular portion 310, a gap filler may be embedded therebetween as set forth above. Due to this fact, rear seat noise including exhaust gas discharge noise, vibration noise and flow-induced noise is reduced, whereby the NVH (noise, vibration and harshness) performance of the vehicle can be improved.

The locking flanges 320 to be locked to the exhaust hole portion 110 of the rear bumper cover 100 are formed adjacent to the outer edge of the main tail trim 300. The locking flanges 320 are defined with locking holes 321 through which fastening bolts 120 are locked. In particular, the locking flanges 320 are formed integrally with the outer edge of the main tail trim 300. Through this, the material cost can be decreased, the ease of assembly is improved, and stiffness can be secured when assembling the rear bumper cover 100 and the main tail trim 300.

As described above, the tail trim cover 200 is connected to and communicates with the tubular portion 310 of the main tail trim 300 and is supported by the rear bumper cover 100 by the medium of mounting brackets 400. The tail pipe of the muffler, through which exhaust gas is discharged, is at least partially inserted into the tail trim cover 200. The exhaust gas guided through the tail pipe of the muffler is discharged to the rear of the vehicle after passing through the tail trim cover 200 and the main tail trim 300.

In various embodiments of the present invention, the tail trim cover 200 is composed of an upper tail trim cover 210 and a lower tail trim cover 220 which are coupled with each other. The upper tail trim cover 210 and the lower tail trim cover 220 are fastened to each other by spot welding. To this end, spot welding portions 230 to be spot-welded with each other are protrusively formed on the sides of the upper tail trim cover 210 and the lower tail trim cover 220.

Figure 6:
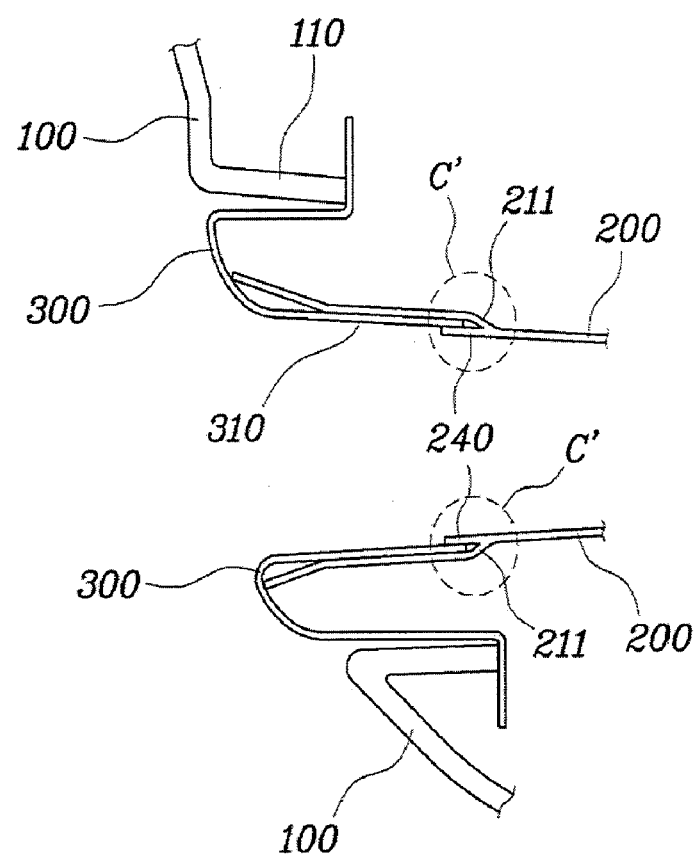
FIG. 6 is a sectional view illustrating an exemplary rear bumper assembly in accordance the present invention.

Referring to FIG. 6, in accordance with various embodiments of the present invention, guide portions 240 are formed in the tail trim cover 200 to cover a joint region C' between the tubular portion 310 and the tail trim cover 200.

The guide portion 240 is placed on the inner circumference of the tubular portion 310 and extends rearward (the leftward direction in FIG. 6) horizontally from the bent portions 211 of the tail trim cover 200 to prevent exhaust gas from being introduced into the joint region C'. Accordingly, exhaust gas does not leak through the joint region C' and can smoothly flow from the tail trim cover 200 to the tubular portion 310.

In another various embodiments of the present invention, the guide portion 240 may be filleted so as to increase continuity between the tail trim cover 200 and the tubular portion 310.

In various embodiments of the present invention, when assembling the main tail trim 300 and the tail trim cover 200, the structure of the joint between the main tail trim 300 and the tail trim cover 200 is modified so that it is possible to prevent noise such as vibration noise and flow-induced noise from being generated. Also, since the locking flanges 320 are formed integrally with the main tail trim 300, the ease of assembly of the rear bumper cover 100 and the main tail trim 300 can be improved. By these facts, in the present invention, it is possible to solve the problems caused in the conventional art due to the fact that exhaust gas discharge noise or flow-induced noise is generated due to the presence of a step or a gap in the joint region A' and the ease of assembly is deteriorated due to the separate formation of the mounting brackets.

As is apparent from the above description, in the present invention, due to the fact that the structure of the joint region between a main tail trim and a tail trim cover is modified, the appearance of an end product can be improved and the assembly tolerances between the main tail trim and the tail trim cover can be elevated. Also, in the present invention, the rear seat noise including exhaust gas-discharge noise, vibration noise and flow-induced noise generated in the joint can be reduced, and therefore, an NVH performance can be improved.

Further, in the present invention, because a locking flange is formed integrally with the main tail trim, rigidity can be increased when assembling a rear bumper cover and the main tail trim with each other, material costs can be decreased, and ease of assembly can be improved.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear bumper assembly of said vehicle, comprising:
    a rear bumper cover having an exhaust hole portion therein;
    a main tail trim mounted to the exhaust hole portion; and
    a tail trim cover coupled to the main tail trim, wherein a bent portion defining a gradually decreasing diameter toward a longitudinal axis of the main tail trim is formed in a joint region between the main tail trim and the tail trim cover,
    wherein a guide portion is formed on the bent portion to cover an inner circumference of a distal end of the tubular portion.

2. The rear bumper assembly according to claim 1, wherein locking flanges for locking the main tail trim to the rear bumper cover are formed monolithically with the main tail trim.

3. The rear bumper assembly according to claim 2, wherein the tail trim cover has an upper tail trim cover and a lower tail trim cover which are coupled with each other.

4. The rear bumper assembly according to claim 3, wherein spot welding portions to be spot-welded with each other are protrusively formed on sides of the upper tail trim cover and the lower tail trim cover.

5. The rear bumper assembly according to claim 1, wherein a guide portion is formed on the bent portion to cover the joint region between the main tail trim and the tail trim cover.

6. A passenger vehicle comprising the bumper assembly according to claim 1.

7. A rear bumper assembly of a vehicle, comprising:
    a rear bumper cover having an exhaust hole portion extending in a forward direction of the vehicle;
    a main tail trim, a portion of which is mounted to the exhaust hole portion; and
    a tail trim cover coupled to and enclosing an outer circumference of a tubular portion of the main tail trim, the tail trim cover including a bent portion to substantially continuously couple the main tail trim and the tail trim cover therebetween to allow an exhaust gas to flow smoothly therethrough,
    wherein a guide portion is formed on the bent portion to cover an inner circumference of a distal end of the tubular portion.

8. The rear bumper assembly according to claim 7, wherein a gap filler is filled between a distal end of the tubular portion and the bent portion so as to increase a continuity between the main tail trim and the tail trim cover.

9. The rear bumper assembly according to claim 7, wherein the bent portion defines a gradually decreasing diameter toward a longitudinal axis of the main tail trim in a joint region of both the main tail trim and the tail trim cover.

10. The rear bumper assembly according to claim 7, wherein a locking flange for locking the main tail trim to the rear bumper cover is formed monolithically on the main tail trim.

11. The rear bumper assembly according to claim 10, wherein the locking flange comprises:
    a dent portion protruding from the mail tail trim in a rear direction of the vehicle; and
    a locking hole placed at the dent portion wherein a fastening bolt is locked therethrough.

12. The rear bumper assembly according to claim 7, wherein the tail trim cover includes an upper tail trim cover and a lower tail trim cover which are coupled with each other.

13. The rear bumper assembly according to claim 12, wherein spot welding portions to be spot-welded with each other are protrusively formed on lateral sides of the upper tail trim cover and the lower tail trim cover respectively.

14. The rear bumper assembly according to claim 7, wherein the upper tail trim cover and the lower tail trim cover are made monolithically to form a single body.

15. The rear bumper assembly according to claim 7, wherein the guide portion is filleted so as to increase continuity between the main tail trim and the tail trim cover.

16. The rear bumper assembly according to claim 7, wherein a gap filler is filled between the distal end of tubular portion and the bent portion so as to increase a continuity between the main tail trim and the tail trim cover.

17. A passenger vehicle comprising the bumper assembly according to claim 7.

* * * * *